Aug. 15, 1950     D. R. BENNETT ET AL     2,518,858
WATER INJECTION SYSTEM FOR DIESEL ENGINES
Filed April 5, 1948     3 Sheets-Sheet 2
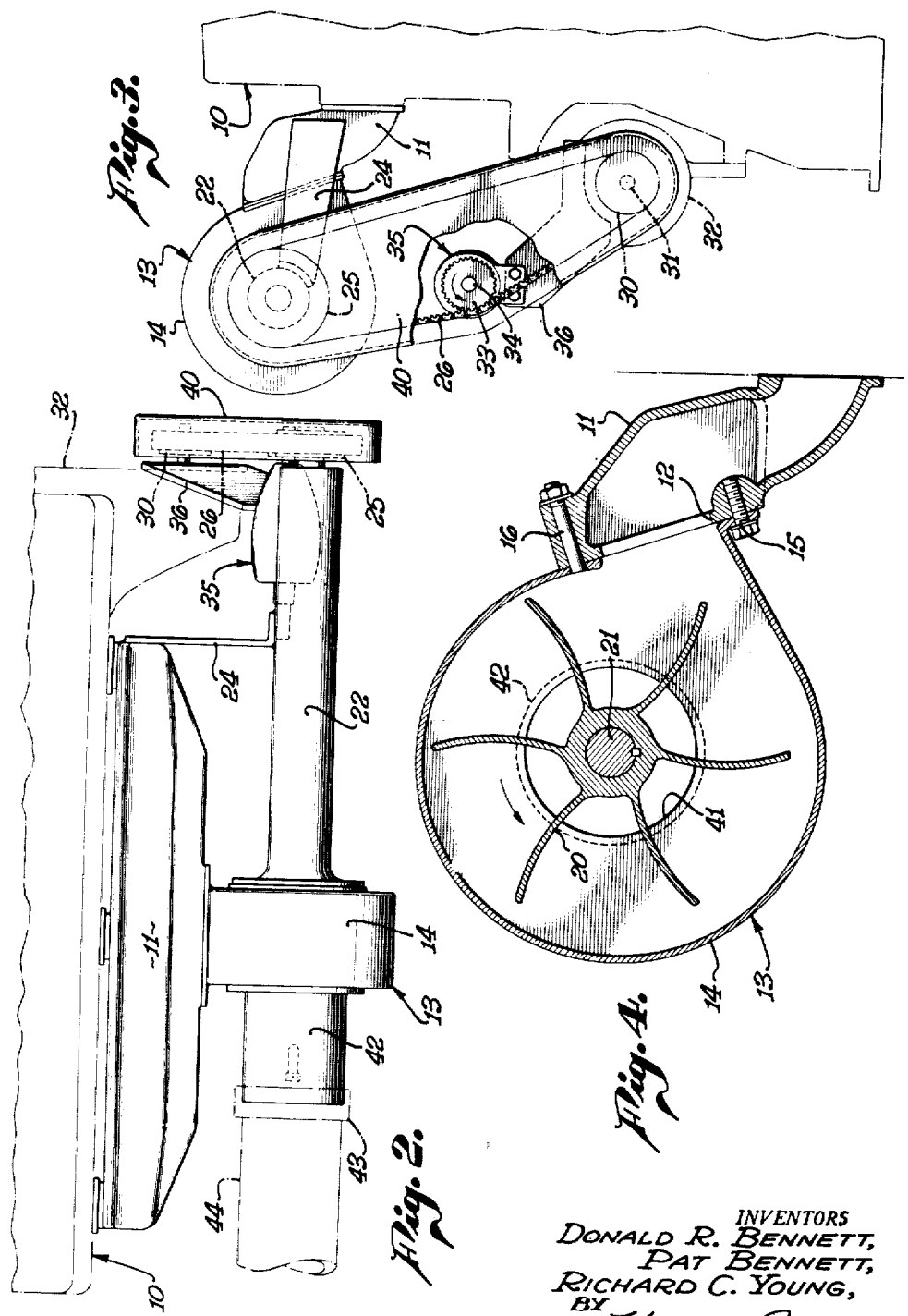
INVENTORS
DONALD R. BENNETT,
PAT BENNETT,
RICHARD C. YOUNG,
BY
Knight & Rodgers
ATTORNEYS.

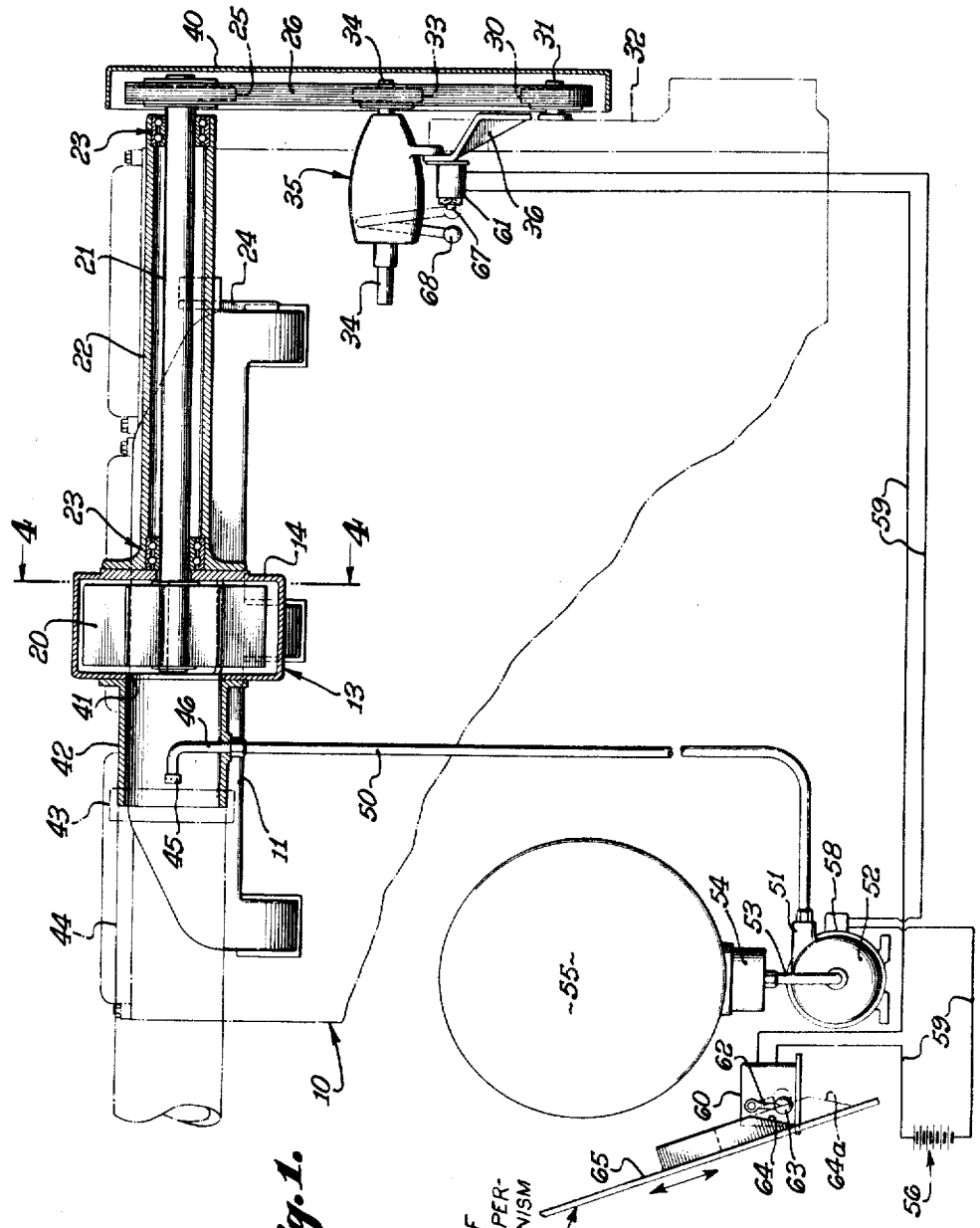

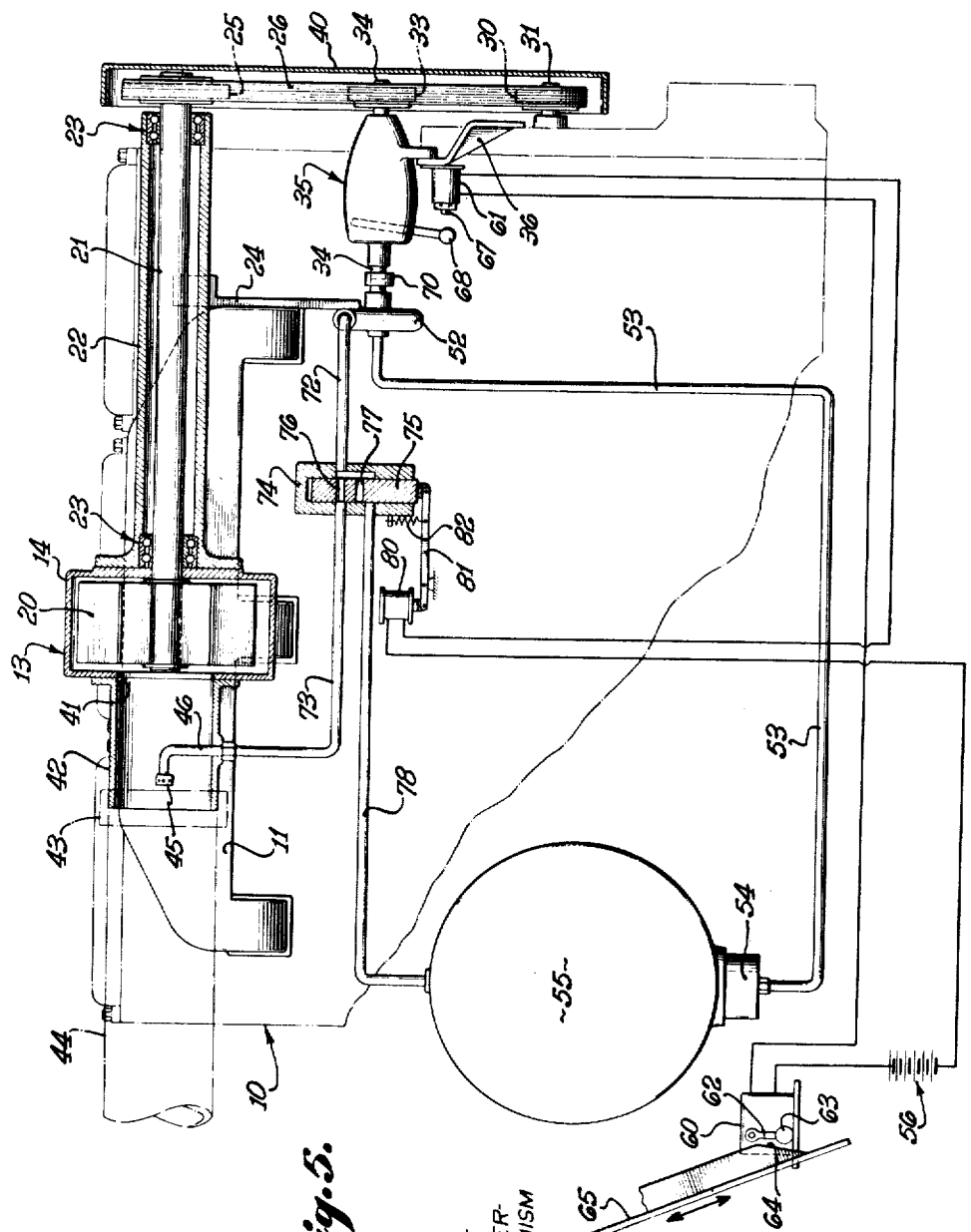

Patented Aug. 15, 1950

2,518,858

UNITED STATES PATENT OFFICE 2,518,858

WATER INJECTION SYSTEM FOR DIESEL ENGINES

Donald R. Bennett and Pat Bennett, Monterey Park, and Richard C. Young, Downey, Calif., assignors of one-half to F. A. Shimer, Los Angeles, Calif.

Application April 5, 1948, Serial No. 19,146
6 Claims. (Cl. 123—25)

The present invention relates generally to water injectors for internal combustion engines, and the primary object of the invention is to provide a water injection system specifically adapted to the operating conditions and requirements of Diesel engines.

The principal advantages derived from the injection of water into the intake manifold are: considerable improvement in the average performance and power output of the engine, and elimination or substantial reduction of smoke in the exhaust in the case of Diesel and similar oil-fuel engines. The improvement in performance is evidenced by smoother, cooler running; higher operating efficiency; and a reduction in the formation of carbon deposits. Furthermore, such carbon deposits as are formed, are softer and more readily removed than would be the case without water injection.

The increase in power output is believed to be due, at least in part, to cooling the intake air by evaporation of the injected water. Tests have shown a reduction in intake air temperature of the order of 15° F. to 20° F., although it will be obvious that a substantially greater reduction is obtained when the air is relatively hot and dry, as in the desert, than where the relative humidity is already high, as along foggy coastal areas. As the air becomes cooled, its volume is decreased once its density becomes increased; hence a greater weight of air is drawn into each cylinder on the intake stroke. The increased quantity of oxygen thus obtained, along with the oxygen in the water available for combustion, not only produces more nearly perfect combustion but also permits the amount of fuel injected into the cylinders for each stroke to be increased.

In a series of dynamometer tests conducted on a standard 150 H. P. truck Diesel engine having fuel injectors designed each to give a normal fuel delivery of from 90 to 96 cc. per minute at normal operating speed, it was found that when the water injector of the present invention was placed in operation, the fuel delivery rate could be stepped up to approximately 120 cc. per minute, provided the engine is precisely tuned. With this increased fuel consumption, the power output measured at the rear wheels of the truck was raised from approximately 120 H. P. to approximately 150 H. P., or an increase of 25%. At the same time, the smoke in the normal exhaust was substantially eliminated, showing more nearly perfect combustion.

One well-known characteristic of Diesel engines is that optimum operating efficiency is obtained in a relatively limited range of engine speeds; hence most Diesel engines, especially those for trucks, are designed to be operated within certain specified limits, typically in the neighborhood of approximately 1400 to 2000 R. P. M. Within this, or a relatively narrower speed range, it becomes practical to employ positive injection of water into the intake manifold, as contrasted with the water carburetion method which has been used heretofore.

In the present invention, water is supplied to the injector nozzle in the intake manifold by a constant delivery pump, and is injected into the air stream in finely atomized form by the pump pressure. This arrangement has the notable advantage of producing no pressure drop, or flow loss, in the intake manifold, such as is inevitable when using the Venturi throat and jet of a conventional water carburetor. Such manifold pressure drops are detrimental to the efficiency of the engine, hence their elimination or prevention is definitely advantageous.

Another object of the invention is to provide a water injection system wherein the water is injected into the intake manifold only when the engine is operating under predetermined power output. This is accomplished in the present invention by means of two serially connected switches which control the flow of water into the manifold. Typically this may be done by regulating the operation of an electric motor driving the injection water pump, or by positioning flow control means, e. g. a valve, in the supply line. One of these switches is controlled by the engine throttle, and is opened to cut off the flow of water whenever the throttle is closed beyond a fixed point. The second switch is controlled by a speed-responsive governor, and cuts off the flow of water whenever the engine speed falls below a predetermined value which is preferably the lower end of its normal operating range. Thus, the first switch operates to cut off the water injection when the engine speed is maintained but the throttle is closed, as is the case when the truck is coasting down hill under compression; while the second switch prevents water from being supplied to the manifold when the engine is operating below its maximum normal or optimum operating speed.

The foregoing and other objects and advantages of our invention will become apparent to those skilled in the art upon consideration of the following detailed description, reference being had to the accompanying drawings, wherein:

Fig. 1 is a partially sectioned, side elevational view of a water injection system embodying the principles of the invention;

Fig. 2 is a top plan view of the same;

Fig. 3 is a fragmentary front end view showing the mechanical drive;

Fig. 4 is an enlarged sectional view of the blower only, taken along the line 4—4 of Fig. 1; and Fig. 5 is a view similar to Fig. 1 showing a variational form of our invention.

In the drawings, the Diesel engine is shown fragmentarily and in outline by dot-dash lines, and is designated in its entirety by the reference numeral 10. Mounted on the side of the engine in communication with the intake ports thereof, is the intake manifold 11.

Attached to the outer side of manifold 11 in communication with the inlet throat 12 thereof is blower 13, the housing 14 of which is secured to the manifold by bolts 15 and studs 16. A centrifugal impeller 20 is rotatably disposed within the housing 14, and is keyed to one end of a drive shaft 21. The drive shaft 21 projects through an opening in the front end wall of the blower housing 14, and extends longitudinally through a tubular shaft housing 22, being rotatably supported therein near its ends by anti-friction bearings 23. The shaft housing 22 is attached at one end to the blower housing 14, and is additionally supported by a laterally projecting bracket 24 attached to the front end of manifold 11.

The front end of the drive shaft 21 projects beyond the end of housing 22, and fixedly mounted thereon is a drive sprocket 25. A silent chain drive 26 is trained around the sprocket 25 and also around another sprocket 30 fixed on the end of auxiliary shaft 31 projecting forwardly from the timing gear cover 32 on the front end of the engine. The chain drive 26 is additionally trained around a sprocket 33 fixed to the front end of a drive shaft 34 that projects forwardly from a speed-responsive governor 35, said governor being mounted on a supporting bracket 36 projecting laterally from the side of the engine. The governor 35 may take any conventional form, and preferably may be either centrifugal or electrical. The sprockets 25, 30, and 33, and chain 26, are preferably, although not necessarily, enclosed by a chain cover 40.

The end wall of the blower housing 14 opposite shaft housing 22 is provided with a circular entrance opening 41 concentric with the axis of the blower 20; and mounted on the housing in registration with the opening 41 is a blower intake manifold 42. The outer end of the manifold 42 is adapted to be connected by a coupling sleeve 43 to an air pipe 44 which leads to the engine air cleaner, not shown here, or which may open to the atmosphere.

Disposed centrally within the blower manifold 42 is an injection nozzle 45 which is carried at the end of an L-shaped portion of water pipe 46. The nozzle 45 is preferably, although not necessarily, provided with a plurality of circumferentially spaced holes arranged around the periphery thereof, said holes spraying the water radially outward in a fine mist so that the entire cross sectional area of the manifold 42 is covered. This insures that the entire mass of air inducted through the manifold is uniformly mixed with the finely atomized spray. It is within the scope of the invention to use any other suitable nozzle. The droplets of water are further broken up into still finer particles by the high speed blower impeller 20 before entering the intake manifold 11, and this insures thorough mixing of air and water and a high degree, if not complete, vaporization of the water.

The tube 46 passes through the side wall of blower manifold 42 and is coupled to a pipe 50 which is connected at its other end to the discharge port 51 of a centrifugal or other rotary type water pump 52. The pump 52 is driven by an electric motor 58 to which it is directly connected, and is preferably of the type delivering a relatively small, constant volume at relatively high pressure. Water is supplied to pump 52 through a pipe 53 which is connected into a filter 54 mounted in the bottom of a water storage tank 55.

Electric current for operating the motor driving the pump 52 is supplied by a battery 56 and the standard engine ignition system. Serially connected into the wires 59 carrying the current from the battery to the motor are two switches 60 and 61 which control the operation of the pump so that water is injected into the intake manifold only during the time that the engine is operating above a predetermined minimum speed and under load. Switch 60 is controlled by the engine throttle operating mechanism, and to this end, an operating arm 62 on the switch is provided with a cam follower 63 which is engageable by a cam 64 connected to the throttle operating rod 65. The cam 64 is operative, as a result of downward longitudinal movement of rod 65, to close the switch 60 whenever the throttle is opened to a predetermined position approximately corresponding to the minimum throttle setting for normal engine operation. The switch arm now rides on the straight top surface of cam 64, and as the cam continues to move downward to some position as 64a, the switch is held closed as the throttle opens farther. When the throttle is closed beyond said predetermined point, cam 64 rises and releases arm 62 to open switch 60, thereby opening the electric circuit and stopping the pump motor. Thus, throttle switch 60 insures that water will be injected into the intake manifold only when the throttle is opened or to beyond a fixed predetermined position; and this throttle opening may be anywhere below, but is preferably but slightly below, the opening required for minimum normal operating speed. If the latter is say 1400 R. P. M., switch 60 may be set to close at say 1200 or 1300 R. P. M. In any event, in order for switch 60 to be closed, the throttle must be opened beyond a set predetermined position, regardless of the speed at which the engine may be turning over due to coasting down hill or other causes.

Switch 61, on the other hand, is actuated only by the speed-responsive governor 35, and its function is to cut off the injection of water except when the engine is operating in its normal speed range, regardless of the throttle position. Switch 61 is normally open and has an operating plunger 67 projecting from one end thereof; and this plunger is engaged and depressed by an actuating arm 68 projecting from the housing of the governor 35. Thus, the solid-line showing of the actuating arm 68 corresponds to the position assumed when the engine is stopped or operating at below normal speed; while the dot-dash representation of the arm shows the position assumed when the engine reaches or exceeds minimum operating speed, at which point the plunger 67 is depressed and closes the switch.

From the foregoing, it will be seen that the motor driving the pump 52 operates only when the two switches 60 and 61 are both closed. This occurs only when the throttle is opened at least to its normal operating position and the engine is operating within its normal rated speed range. If the throttle is closed below a certain predetermined point, or if the engine speed falls below a predetermined R. P. M., one of the two switches opens and as a result the motor driving pump 52 stops and the water injection is stopped. This automatic control of the pump motor is extremely advantageous because it causes water to be delivered only when the engine power output is above a previously established minimum and it stops the injection of water when it is not needed, as when coasting down hill under load, or when idling. Another important feature of this system is that it enables the engine to be cleared of all moisture just before a shutdown, by merely running the engine for a few minutes at a fast idling speed. Under such conditions, both of the switches 60 and 61 would remain open, and there would be no water injection. The heat of the engine causes any moisture trapped in the manifold to evaporate, leaving the manifold and cylinders dry when the engine is shut off, so that corrosion is prevented. Also there is no tendency for any water to enter the manifold except when the engine is operating at its normal speed.

A variational form of our invention is illustrated in Fig. 5 which is the same as the embodiment previously described except that the water pump is mechanically rather than electrically driven and as a consequence the flow of water is controlled by valve means rather than by controlling the pump itself. In this embodiment of our invention, pump 52 is aligned with governor 35 so that the pump can be driven from drive shaft 34 to which it is connected by coupling 70. In the same manner as before, water is delivered to pump 52 through line 53 from storage tank 55.

The pump output is delivered to nozzle 45 through lines 72 and 73 which are connected to a by-pass or diverter valve 74. Valve 74 is shown diagrammatically in Fig. 5 and may take any one of a number of conventional forms suitable for this purpose; but it is here shown as typically comprising a longitudinally movable plunger 75 containing upper and lower passages 76 and 77 respectively. When the plunger is in the upper position as shown, water delivered from the pump flows through line 72, passage 76 and line 73 to a nozzle 45. When the plunger is lowered, passage 76 no longer registers with the outlet to line 73 and the pump output flows through passage 77 and pipe 78 into reservoir 55. Thus, under these latter conditions the pump output is by-passed back to the storage tank so that water is merely recirculated in the system without being delivered to the manifold.

Valve 74 is actuated by solenoid 80 which is located in the electrical circuit at the same relative position as motor 58. Solenoid 80 is connected to plunger 75 by lever arm 81, as is conventional practice, to obtain increased travel of the plunger, which is normally biased toward its upper position by tension spring 82.

In this form of our invention, in which the pump is always operating, solenoid 80 and valve 74 are substituted for the electric motor as means for mechanically starting and stopping the flow of water to the manifold. The operation of this system is the same as previously described since switches 60 and 61 are wired in the same fashion and consequently operate to control water flow in the manner described above.

Another advantageous feature of the invention accrues from the use of a blower in the intake manifold system which, in addition to mixing the spray and air more intimately and further vaporizing or atomizing the moisture particles, also contributes a slight amount of supercharge, which is effective to increase the horsepower output of the engine.

In order to enable the engine to develop the maximum horsepower of which it is capable when operating with the water injector of the invention, it is necessary to increase the maximum delivery of fuel through the fuel injection nozzles. It will usually be advantageous also to advance the period of fuel injector operation with respect to the valves, which gives a longer combustion period. It is also within the scope of the invention to add a valve of any suitable kind in the water line 50 which enables the operator to adjust the rate of flow to suit prevailing temperature and humidity conditions.

While we have shown and described in considerable detail illustrative forms of our invention, it is to be understood that such details are not restrictive thereon, and that various changes may be made in the shape and arrangement of the several parts without departing from the broad scope of the invention as defined in the claims appended hereto.

We claim:

1. A water injection system for internal combustion engines comprising an injector nozzle disposed within the intake manifold system of the engine, a pump connected with said nozzle to supply the latter with water under pressure for injection into the intake airstream at a substantially constant rate of flow, a speed-responsive governor connected to said engine, means actuated by said governor to stop the injection of water whenever the speed of said engine falls below a predetermined range, a cam member operatively connected to the engine throttle, and means actuated by said cam member for stopping the injection of water whenever said throttle is closed beyond a predetermined position.

2. A water injection system for internal combustion engines comprising an injector nozzle disposed within the intake manifold system of the engine, a pump connected with said nozzle to supply the latter with water under pressure for injection into the intake airstream, electrically actuated means for controlling the flow of water to said nozzle, a source of electric current, a circuit for carrying current from said source to said electrically actuated means to operate the latter, said circuit including a pair of serially connected switches, means responsive to the speed of said engine for operating one of said switches to stop the flow of water to said nozzle whenever the speed of the engine falls below a predetermined range, and means responsive to the position of the engine throttle for operating the other switch to stop the flow of water to said nozzle whenever the engine throttle is closed beyond a predetermined position.

3. A water injection system for internal combustion engines comprising an injector nozzle disposed within the intake manifold system of the engine, an electric motor driven pump connected with said nozzle to supply the latter with water under pressure for injection into the intake airstream at a substantially constant rate of flow, a source of electric current, a circuit for carrying current from said source to the motor driving said pump, said circuit including a pair of serially connected switches, means responsive to the speed of said engine for closing one of said switches whenever the engine is operating within a predetermined speed range, and for opening the switch when the engine speed falls below the lower limit of said range, and a cam member operatively connected to the engine throttle and engageable with the other of said switches for closing the latter only when the throttle is opened beyond a predetermined position, said two switches forming a closed circuit for operating said pump motor, whereby water is injected into the intake airstream only while the engine is operating under predetermined load conditions.

4. A water injection system for internal combustion engines comprising an injector nozzle disposed within the intake manifold system of the engine, a pump connected with said nozzle to supply the latter with water under pressure for injection into the intake airstream, a by-pass valve in the water supply line, means responsive to the speed of the engine for controlling said valve so that water is supplied to said nozzle only when the engine is operating within a predetermined range, said means causing said water to be cut off when the engine speed falls below the lower limit of said range, and other means responsive to the position of the engine throttle for controlling said valve so that water is supplied to said nozzle only when the throttle is opened beyond a predetermined position, said last-named means actuating said valve to cut off the flow of water to said nozzle whenever the throttle is closed beyond said predetermined position.

5. A water injection system for internal combustion engines comprising an injector nozzle disposed within the intake manifold system of the engine, a water pump operatively connected with said engine to be driven thereby, a pipe line connecting said pump with said nozzle, whereby the latter is supplied with water under pressure for injection into the intake airstream at a substantially constant rate of flow, an electrically actuated by-pass valve connected into said pipe line, a source of electric current, a circuit for carrying current from said source to said electrically actuated valve for operating the latter, said circuit including a pair of serially connected switches, means responsive to the speed of said engine for closing one of said switches whenever the engine is operating within a predetermined speed range and for opening the switch when the engine speed falls below the lower limit of said range, and a cam member operatively connected to the engine throttle and engageable with the other of said switches for closing the latter only when the throttle is opened beyond a predetermined position, said two switches, when closed, forming a closed circuit for operating said by-pass valve, whereby water is supplied to said nozzle for injection into the intake airstream only while the engine is operating under predetermined load conditions.

6. A water injection system for internal combustion engines, comprising: an injector nozzle disposed within the intake manifold system of the engine; water delivery means for delivering water under pressure to the nozzle; and flow control means for controlling the operation of said water delivery means including an electric circuit, a pair of serially connected electric switches in the circuit, means responsive to the speed of said engine for operating one of said switches to stop the flow of water to said nozzle whenever the speed of the engine falls below a predetermined range, and means responsive to the position of the engine throttle for operating the other of said switches to stop the flow of water to said nozzle whenever the engine throttle is closed beyond a predetermined position.

DONALD R. BENNETT.
PAT BENNETT.
RICHARD C. YOUNG.

REFERENCES CITED

The following references are of record in the file of this patent:

UNITED STATES PATENTS

| Number | Name | Date |
|---|---|---|
| 1,086,634 | Wright | Feb. 10, 1914 |
| 1,494,261 | Loetscher | May 13, 1924 |
| 1,899,476 | Paine | Feb. 28, 1933 |
| 2,392,565 | Anderson et al. | Jan. 8, 1946 |